United States Patent [19]

Murakami

[11] Patent Number: 4,865,177
[45] Date of Patent: Sep. 12, 1989

[54] STRUCTURE AND METHOD FOR ASSEMBLING FRICTION FACINGS

[75] Inventor: Kiyoharu Murakami, Neyagawa, Japan

[73] Assignee: Kabushiki Kaisha Daikin Seisakusho, Neyagawa, Japan

[21] Appl. No.: 143,998

[22] PCT Filed: May 26, 1987

[86] PCT No.: PCT/JP87/00337

§ 371 Date: Dec. 7, 1987

§ 102(e) Date: Dec. 7, 1987

[30] Foreign Application Priority Data

Jun. 2, 1986 [JP] Japan .................................. 61-128999

[51] Int. Cl.⁴ .............................................. F16D 13/60
[52] U.S. Cl. ............................. 192/107 R; 192/107 C
[58] Field of Search ......................... 192/107 R, 107 C

[56] References Cited

U.S. PATENT DOCUMENTS

| | | | |
|---|---|---|---|
| 1,562,144 | 7/1923 | Burns | 192/107 R |
| 1,656,779 | 1/1926 | Desroziers | 192/107 R |
| 1,846,560 | 2/1932 | Kattwinkel | 192/107 R |
| 2,054,210 | 9/1936 | Weisenburg | 192/107 R |
| 2,237,624 | 4/1941 | Oldham | 192/107 R |
| 3,480,117 | 11/1969 | Agren et al. | 192/107 R |
| 4,537,299 | 8/1985 | Fukatani | 192/107 C |

FOREIGN PATENT DOCUMENTS

| | | | |
|---|---|---|---|
| 590993 | 4/1959 | Italy | 192/107 R |
| 47-24435 | 11/1972 | Japan . | |
| 58-24542 | 2/1983 | Japan . | |
| 58-46231 | 3/1983 | Japan . | |

Primary Examiner—Leslie A. Braun
Assistant Examiner—Andrea Pitts
Attorney, Agent, or Firm—Armstrong, Nikaido, Marmelstein, Kubovcik & Murray

[57] ABSTRACT

An annular support of a clutch disc made of a plate member having connecting apertures and radial slits. Friction material facings are die pressed into engagement with the plate member with dies which force the friction material through the apertures and slits to integrally connect the facings to the plate member and to each other. Each facing is provided at its surface with hollows positioned over the slits and having circumferential widths wider than the slits. The hollows overlap the edge portions of the slits at the opposite sides of the slits. The hollows in the facings are formed by projections on the faces of the dies in the forming operation.

1 Claim, 1 Drawing Sheet

STRUCTURE AND METHOD FOR ASSEMBLING FRICTION FACINGS

TECHNICAL FIELD

The present invention relates to a fricton facing assembly used in a friction clutch of an automobile and other uses, and particularly to a structure and method for fixing the friction facings to a support or metal support plate of a clutch disc.

An example of such facing assembly is described in the Japanese Utility Model Application No. 56-98240 (U.S. Pat. No. 4,537,299). In the assembly, an annular support which forms a radially outer part of a clutch disc is provided with a plurality of apertures, and a pair of facings disposed at opposite sides of the support are integrally connected together and fixed to the support by portions of the facings which enter the apertures.

According to this structure, as compared with a conventional structure in which facings are riveted onto a support, a manufacturing process can be simple and the permissible wear can be increased, resulting in a long durability.

However, in the structure in said U.S. patent, a strain may be generated in the support by a heat when the facing materials located at opposite sides of the support are formed by a press machine in the manufacturing process. The strain may cause axial deviation or error of the position of the support between the facings, and thus, may cause deviation of thickness of the facings, resulting in a short durability of the facings.

Accordingly, it is an object of the invention to provide a method and a structure for assembling facings, overcoming the abovenoted disadvantages.

DISCLOSURE OF INVENTION

The invention provides a structure for assembling friction facings comprising an annular support which is made of a plate member and is disposed at an outer peripheral portion of a clutch disc; and a pair of annular friction facings supported on opposite surfaces of the support, respectively. The support is provided, at least at supporting portions which supports the facings, with connection apertures and radial slits extending between the inner and outer peripheries of the supporting portions. The facings include portions which enter said apertures and slits and integrally connect both facings together. Each facing is provided at the surface opposite to the support, with hollows positioned at near the slits and having circumferential widths wider than those of the slits. The hollows axially overlap the edge portions of the slits in the supporting portions at circumferentially opposite sides of the slits.

The invention further provides a method for assembling friction facings of a clutch disc comprising an annular support which is made of a plate member and is disposed at an outer peripheral portion of the clutch disc; and a pair of annular friction facings supported on opposite surfaces of the support, respectively; the support being provided at least at supporting portions which support the facings with connection apertures and radial slits which extend between the inner and outer peripheries of the supporting portions. The facings include poortions which enter the apertures and slits and integrally connect opposite facings together the method comprises the steps in which a pair of facing materials are disposed at the opposite sides of the support; and a forming step in which the facing materials are formed into predetermined forms by forming dies. In the forming step, portions of the facing materials are urged into the connecting apertures and the slits to integrally connect the facings together. Simultaneously projections, which are formed on the dies, project into the facing materials toward the slits to support edge portions of the supporting portions at circumferentially both sides of the slits so as to position the support at the axially central position between the facings while forming the hollows on the surface of the facings.

BRIEF DESCRIPTION OF THE INVENTION

DETAILED DESCRIPTION OF THE PREFERRED EMBODIMENT

Figure 1:
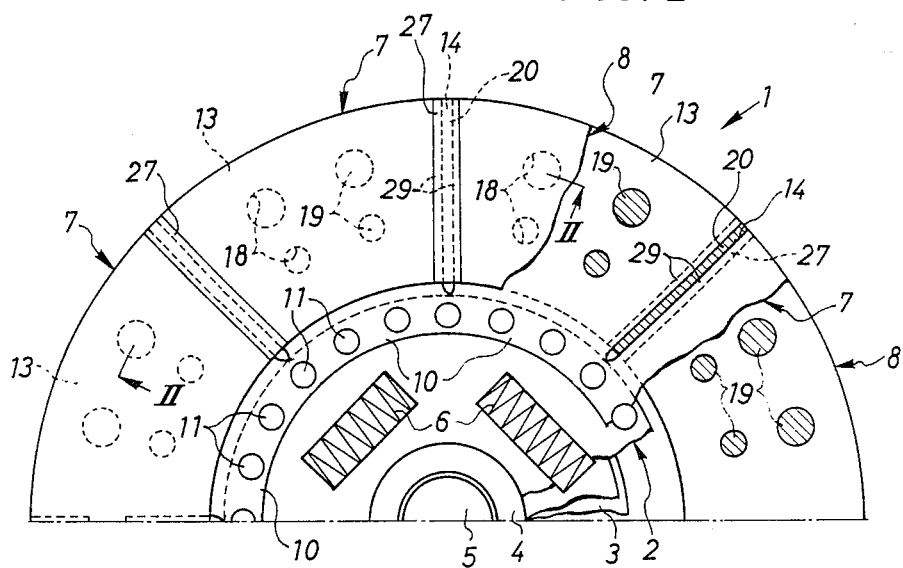
FIG. 1 is a fragmentary plane view of a clutch disc including an embodiment of the invention with parts cut away.

Referring to FIG. 1, a clutch disc 1 comprises an annular clutch plate 2 and an annular retaining plate 3, which are input members, as well as a hub 4 which is an output member and is connected to an output shaft 5. The clutch plate 2 and the retaining plate 3 are connected to a radial flange of the hub 4 through springs 6. Although the present invention is applied to the clutch disc 1 described above, it may be applied to other types of the clutch discs.

The clutch disc 1 further comprises annular metal support plate or support 7 and a pair of annular friction facings 8, all of which extend along the outer periphery of the clutch plate 2. Inner peripheral portion of the support 7 forms a fixing portion 10, which is fixed onto the outer peripheral portion of the clutch plate 2 by circumferentially spaced rivets 11.

The support 7 is provided at radially middle and outer portion, which is radially outside the fixing portion 10, with a plurality of radial slits 14. The radially middle and outer portion of the support 7 is divided by the slits 14 into a plurality of facing supporting portions 13. The facings 8 are disposed at opposite sides of the portions 13 and are closely seated thereon.

Figure 2:
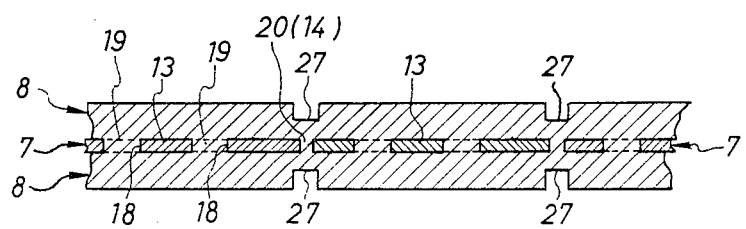
FIG. 2 is a schematic sectional view taken alone line II—II in FIG. 1.

Each supporting portion 13 is provided with connecting apertures 18. As illustrated in FIG. 2, portions 19 and 20 of the facings 8 enter and fill the apertures 18 and the slits 14 without a space. These entering portions 19 and 20 integrally connect the both facings 8 together and firmly fix them to the support 7.

Figure 3:
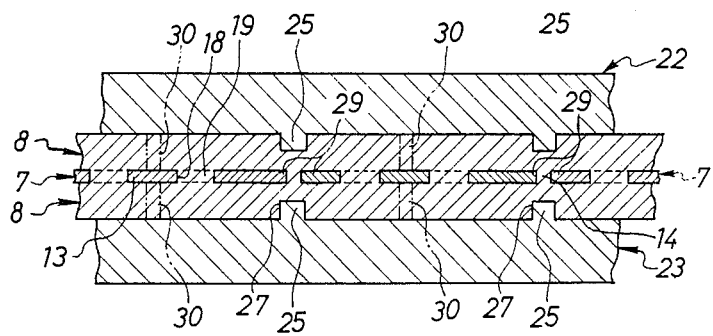
FIG. 3 is a schematic sectional view illustrating the forming process.

An assembly of the facings 8 and the support 7 described above is manufactured as follows. In the first step, materials of the facings 8 are located at the opposite sides of the support 7. These facing materials are conventional organic materials, such as asbestos bound by rubber or plastics, which can be pressed into predetermined forms. Then, as shown in FIG. 3, pressure is applied to the facing materials by a pair of heated forming dies 22 and 23 to form the facings 8. In this press forming operation, portions of the facings 8 enter the connecting apertures 18 and the slits 14 to form the integral connection portions 19 and 20, respectively.

The forming dies 22 and 23 are provided at their forming or pressing surfaces with projections 25, respectively, which form hollows 27 on the facings 8. As shown in FIG. 1, these hollows 27 extend in substantially radial direction over and along the slits 14, respectively. A circumferential width of each hollow 27 is wider than that of the slit 14, so that each hollow 27 axially overlap the slits 14 and side edge portions 29 of the facing supporting portions 13 at both sides of the slit 14. The sizes of the projections 25 correspond to those of the hollows. Therefore, in the forming operation described above, the projections 25 pinch and hold the opposite surfaes of the edge portions 29 with thin facing material layers therebeween. Thus, the support 7 is positioned at the axially central position in the integrated facings 8, and the formed facings 8 at both sides of the support 7 have a uniform thickness.

As described above, in the forming operation of the facings 8 with the support 7 therebetween, the support 7 is axially held and positioned by the projections 25 which form the hollows 27 on the facings 8, so that the support 7 is precisely positioned in the axially central position in the integrated facings 8 and is prevented from axial deviating or deflecting which may be caused by a thermal strain. Further, since the slits 14 are formed in the support 7, the thermal strain can be released through the side edge portions 29 of form the facings 8 having the uniform thickness, resulting in the long durability thereof.

In a modification, as shown in FIG. 3, rod-like projections 30 may be provided on the forming surfaces of the dies 22 and 23 in addition to the projections 25, so that the projections 30 may push and hold the central portions of the facing supporting portions 13.

Although an annularly integral member, i.e, support 7, is used as support means for supporting the facings in the illustrated embodiment, a plurality of annularly arranged conventional cushioning plates may be used as the support means.

As described hereinabove, the present invention can be advantageously applied to the friction facing assembly of a clutch in an automobile and other uses, and can be particularly advantageously applied to such a type of the assembly in which there is a large thermal load during the forming operation of the facings.

I claim:

1. A friction facing assembly comprising an annular support disposed at an outer peripheral portion of a clutch disc; and a pair of annular friction facings supported on opposite surfaces of said support, respectively; said support being provided at least at supporting portions which support said facings with connecting apertures and radial slits extending between the inner and outer peripheries of said supporting portions; said facings including portions which enter said apertures and slits and integrally connect both facings together; each facing being provided at the surface opposite to said support with hollows positioned at said slits and having circumferential widths wider than those of the slits; and said hollows axially overlapping edge portions of said slits at circumferentially opposite sides of said slits.

* * * * *